United States Patent [19]

Carson

[11] 3,917,136
[45] Nov. 4, 1975

[54] VEHICLE RACK MOUNTING MEANS

[76] Inventor: Miles Thomas Carson, 1120 10th St., Denver, Colo. 80204

[22] Filed: May 8, 1974

[21] Appl. No.: 468,141

[52] U.S. Cl. .............................. 224/42.1 F; 52/23
[51] Int. Cl.² .......................................... B60R 9/00
[58] Field of Search ...... 224/42.1 R, 42.1 F, 42.1 E, 224/42.1 D, 42.1 G, 42.1 H, 29 R, 42.45 R; 214/450; 296/23 MC; 280/179; 296/95 R; 52/11, 23; 294/67 E, 67 R; 248/226 B, 201, 228

[56] References Cited
UNITED STATES PATENTS

| | | | |
|---|---|---|---|
| 2,933,339 | 4/1960 | Aluden | 294/67 E |
| 3,260,929 | 7/1966 | Hedgepeth | 224/42.1 E X |
| 3,381,866 | 5/1966 | Wickett | 224/42.1 E |
| 3,744,840 | 7/1973 | Van Cleave | 296/23 MC |

FOREIGN PATENTS OR APPLICATIONS 879,027   10/1961   United Kingdom ............ 224/42.1 G

*Primary Examiner*—Robert J. Spar
*Assistant Examiner*—Jerold M. Forsberg
*Attorney, Agent, or Firm*—Harold L. Stowell

[57] ABSTRACT

A vehicle top rack mounting having a gutter rail reinforcement plate is provided whereby the normal loads on the vehicle's gutter rail are in part transferred to the reinforcement. The rack mounting may also include an enlarged J-hook to reduce stress concentrations applied to the gutter rail and reinforcement plate.

7 Claims, 4 Drawing Figures

VEHICLE RACK MOUNTING MEANS

BACKGROUND OF THE INVENTION

It is well known to provide racks for the carriage of articles on the tops of automotive vehicles and it has been conventional practice to releasably connect such racks via clamps adapted to engage the vehicle's gutter rail.

There are two inherent and critical weaknesses in the present methods of attaching a rack to a vehicle's gutter rails. First, gutter rails are not in general strong enough to withstand the weight often applied to such racks, for example, when transporting ladders and the like. This is especially true in respect to the dynamic forces developed during acceleration and deceleration of a moving vehicle. The second inherent weakness in most conventional vehicle top mounted racks is in the design of the J-hook which results in the concentration of stresses in small areas of the gutter rails and the tendency of conventional J-hooks to straighten out under stress often permitting the J-hooks to slip from the gutter rails leaving the rack unattached at one or more points.

THE PRESENT INVENTION

It is an object of the present invention to overcome each of the foregoing discussed inherent weaknesses in most conventional roof top mounted racks.

It is another object to provide an improved mounting means for a vehicle top mounted rack which relieves substantially all of the stress on the vehicle's gutter rail and transmits such forces over an extended surface of the vehicle top and/or side walls.

Another object is to provide an improved attaching means which is positive in actuation, rugged in construction, simple to operate and which does not appreciably increase the cost of construction over conventional vehicle top mounted racks.

The present invention may be generally defined as including a mounting assembly for a vehicle roof mounted rack comprising a rigid plate having a substantial extended surface portion and having along one edge thereof a J-shaped terminus, the rigid plate being adapted to be secured to a vehicle at each rack attaching site with the J-shaped terminus in contact with the vehicle gutter rail and a gutter rail clamp member including an adjustable J-hook and a presser foot engaging therebetween the J-shaped terminus of said rigid plate and the vehicle's gutter rail.

The invention will be more particularly described in reference to the accompanying drawing wherein.

Figure 2:
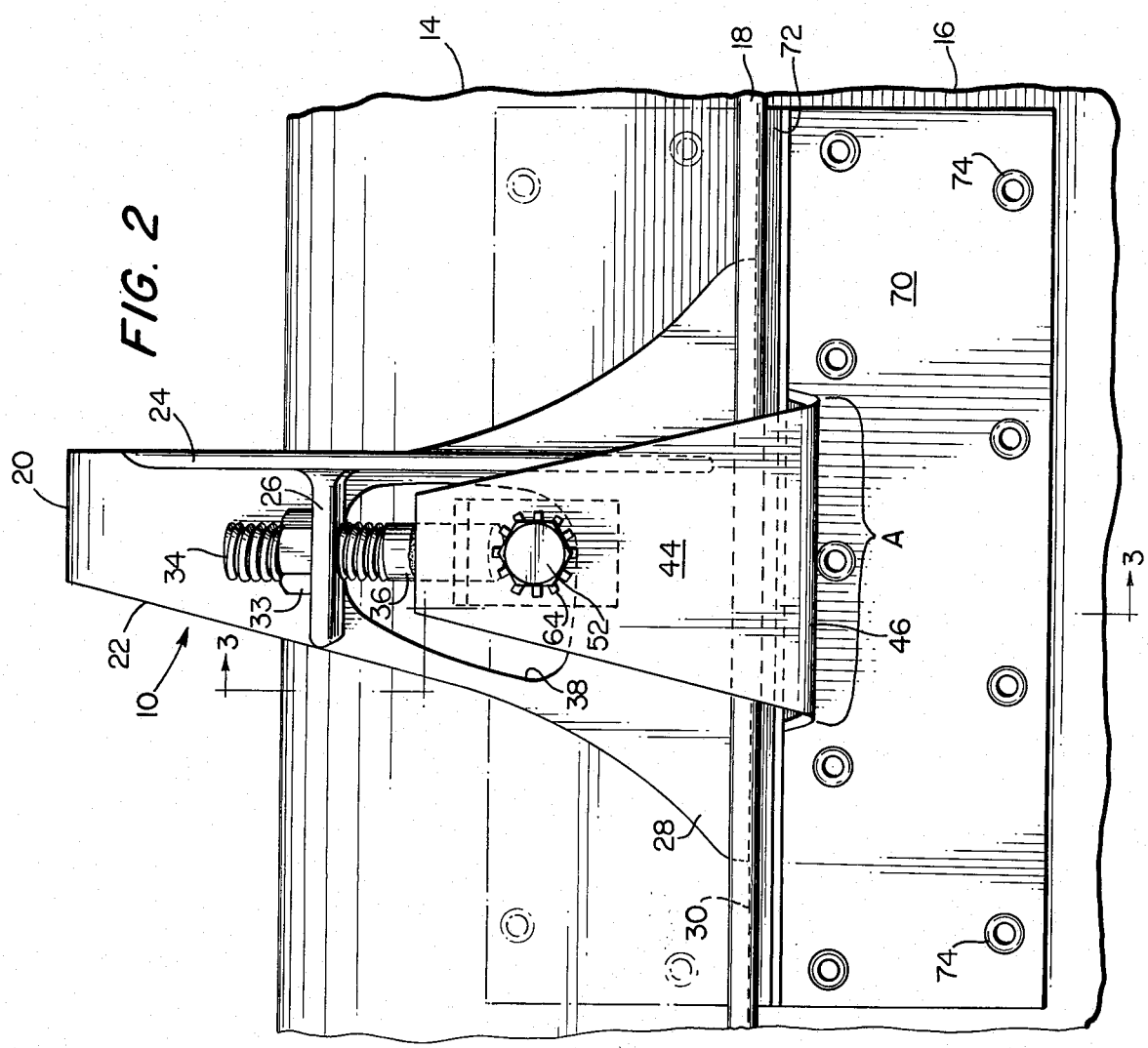
FIG. 2 is a fragmentary enlarged side view of the structures shown in FIG. 1.

Referring to the drawing, and in particular to FIGS. 1, 2, and 3, 10 generally designates a rack adapted to be mounted from the roof or top of a conventional automotive vehicle generally designated 12, which vehicle includes at least a top or roof portion 14, side panels 16 and a gutter rail 18.

In the illustrated form of the invention, the rack 10 includes a plurality of ridge members 20 which extend across the vehicle top 14 in vertically and longitudinally spaced arrangement as shown in the drawing. The bridge members 20 may be longitudinally interconnected, support rack means for luggage, etc.

Figure 4:
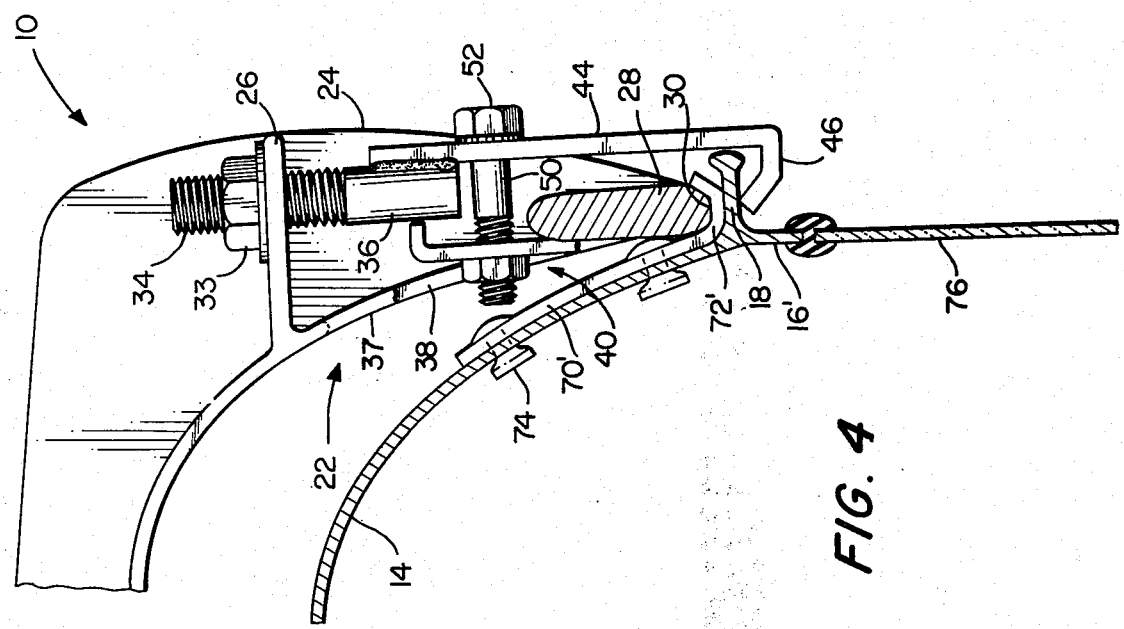
FIG. 4 is a view similar to that illustrated in FIG. 3 of a modified form of the present invention.

Each end of the bridge members 20 is composed of a downwardly directed leg generally designated 22. The legs are composed of a main depending rib 24, a table or plate member 26, and an extended foot 28 the lower surface thereof being adapted to rest upon the upper surface of the gutter rail 18 or as to be more fully described hereinafter, a supplemental plate as shown in FIG. 4.

Figure 1:
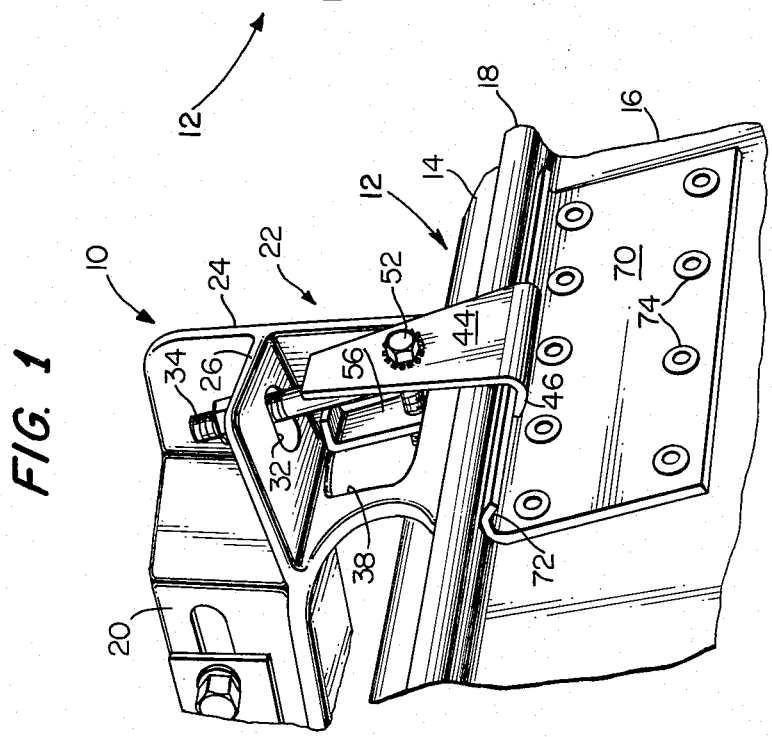
FIG. 1 is a perspective view of a portion of a vehicle top mounted rack including the improved rack attaching means of the present invention.

The top plate 26 of each of the legs 22 is slotted as at 32, FIG. 1 of the drawing, to receive the shank portion 34 of a threaded stud 36. The curvilinear wall 37 of each leg 22 is provided with an opening 38 adapted to receive keeper means generally designated 40.

The lower end 42 of clamping bolt or stud 36 has welded thereto or formed integrally therewith a J-hook 44. The J-hook 44, as more clearly shown in FIG. 2 of the drawing, has a substantial base length designated A in FIG. 2 and an inwardly curved hook portion 46. The extended base portion provides a large gripping surface and in a very adequate form of the present invention a width A in the order of two to three inches has prooved very satisfactory.

Below the zone of attachment between the lower end 42 of the clamping bolt 36 and the J-hook 44, the J-hook is bored to receive a keeper bolt 50 having a head 52 and threaded portion 54. The bolt 50 is of a length such that it will receive on its threaded end a keeper plate 56, the lower end 58 of which is adapted to bear against the inner surface of the presser foot portion 28 of each of the legs 22 while the upper portion 60 is bent inwardly and adapted to engage the inner surface of the adjusting bolt 36 when the nut 62 is tightened.

In a preferred embodiment of the present invention, the adjusting bolt 36 has a diameter of ⅜ inch, the keeper plate 56 and the J-hook 44 are formed from 10 gauge steele and the keeper bolt 50 is maintained in its tightened position by at least one lock washer 64.

The assembly also includes an extended surface plate member generally designated 70 with the plate member having one terminus designated 72 formed in a J-configuration and adapted to sit under the gutter rail 18 when the plate 70 is rigidly attached to the external surface of a side panel 16 of the vehicle.

In the illustrated embodiment of the invention, the plate member 70 is attached to a side panel 16 by a plurality of rivets 74 and the plate member 70 is formed from 12 gauge steel, has a length of 6 inches and a width of 2 inches.

Figure 3:
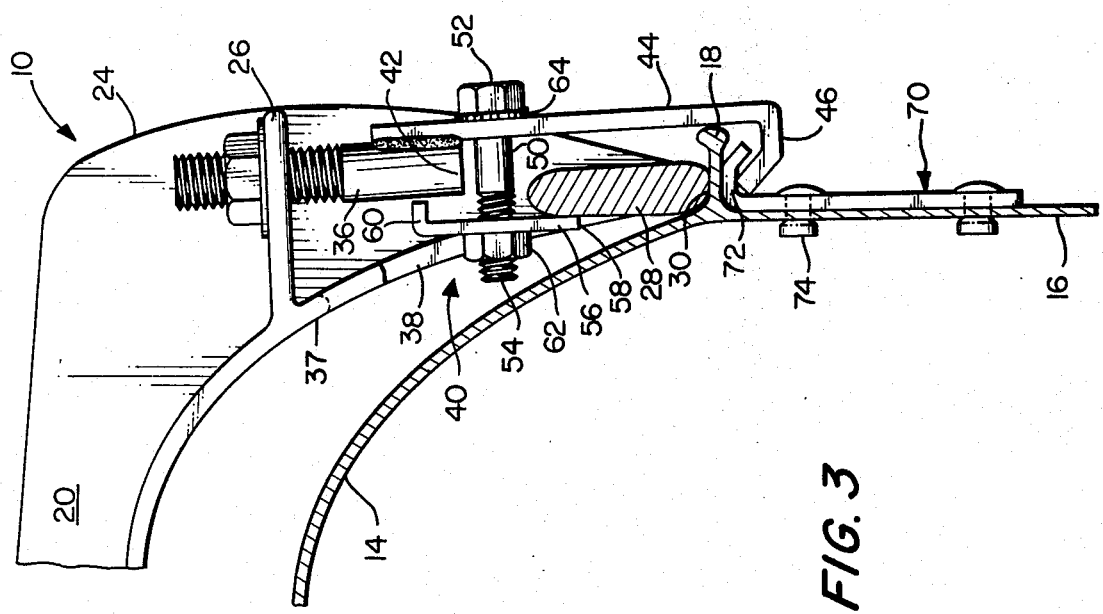
FIG. 3 is a section substantially on lines 3—3 of FIG. 2.

As hereinbefore discussed, FIG. 4 illustrates a modified form of the invention wherein at the particular location of a depending leg 22 of one or more of the bridge members 20, the side panel 16' is discontinuous and provided with, for example, a window 76 so that a plate member such as plate 70 of the FIGS. 1, 2 and 3 form of the invention cannot be attached with the J-shaped terminus 72 in engagement with the under surface of the gutter rail 18. In such instances, a modified plate member 70' is provided which plate member is shaped to conform to the configuration of the roof or top 14 adjacent the gutter rail 18 and the lower terminus of the plate 70' is configured as at 72' to fit into the upper surface of the gutter rail 18, whereby the lower surface 30 of the pressplate element 28 of the lower extremity of the leg 22 is engaged upon the upper surface of the J-terminus 72'. The modified plate member 70' is attached to the top 14 of the vehicle by, for example, suitable rivets 74.

In operation of the improved attaching means of the present invention, the bridge members 20 are placed across the roof or top of the vehicle with the lower surface 30 of the depending legs 22 positioned on the gutter rail as shown in FIG. 3 or on the upper surface of the terminus 72' of plate 70' as the case may be and the nuts 33 of the bolt 36 are loosened to permit the curved portions 46 of the J-hooks 44 to be positioned under the gutter rail and under the J-terminus 72 of the form of the invention shown in FIG. 3 or in contact with the under surface of the gutter rail 18 as shown in FIG. 4. Then the nuts 33 are tightened to cause clamping of the rack members between the lower surfaces of the pressplate 30 and the J-hook 46 with the gutter rails 18 and the termini 72 or 72' therebetween. With the nuts sufficiently tightened to rigidly clamp the racks to the vehicle top, keeper bolts 50 are tightened to prevent lateral motion in the J-hooks and to insure an assembly which will carry out the aims and objects hereinbefore set forth.

Having described preferred embodiments of my invention, it will be apparent to those skilled in the art that the aims and objects hereinbefore set forth and others are fully accomplished.

I claim:

1. A mounting assembly for a vehicle roof mounted rack removably fastened to a vehicle gutter rail comprising a rigid plate having a substantial extended surface portion and terminating along one edge thereof in a J-shaped terminus, said rigid plate adapted to be secured to a vehicle at each rack attaching site with the J-shaped terminus in contact with the vehicle gutter rail and a gutter rail clamp member including an adjustable J-hook and a presser foot engaging therebetween the J-shaped terminus of the rigid plate and the vehicle gutter rail.

2. The invention defined in claim 1 wherein the said J-shaped terminus is in contact with the under surface of the gutter rail.

3. The invention defined in claim 1 wherein the said J-shaped terminus is in contact with the upper surface of the gutter rail.

4. The invention defined in claim 1 wherein certain of the said J-shaped termini are in contact with the under surface of the vehicle gutter rail and other of said J-shaped termini are in contact with the upper surface of the vehicle's gutter rail.

5. The invention defined in claim 1 wherein the width of the adjustable J-hook is about one-third the width of the extended surface rigid plate.

6. The invention defined in claim 5 wherein the length of said rigid plate member is about 3 inches.

7. The invention defined in claim 1 including adjustable keeper means extending between the adjustable J-hook and the said presser foot.

* * * * *